(12) United States Patent
Yano

(10) Patent No.: US 11,829,652 B2
(45) Date of Patent: Nov. 28, 2023

(54) INFORMATION PROCESSING APPARATUS, INFORMATION PROCESSING METHOD, SYSTEM, AND NON-TRANSITORY COMPUTER-READABLE STORAGE MEDIUM WITH REMOTE OPERATION AND LOCAL NETWORK

(71) Applicant: CANON KABUSHIKI KAISHA, Tokyo (JP)

(72) Inventor: Yukari Yano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/903,511

(22) Filed: Sep. 6, 2022

(65) Prior Publication Data
US 2023/0072219 A1 Mar. 9, 2023

(30) Foreign Application Priority Data
Sep. 8, 2021 (JP) .................. 2021-146349

(51) Int. Cl.
*G06F 3/12* (2006.01)
*H04N 1/32* (2006.01)

(52) U.S. Cl.
CPC .......... *G06F 3/1204* (2013.01); *G06F 3/1257* (2013.01); *H04N 1/32379* (2013.01); *H04N 1/32523* (2013.01); *G06F 3/1286* (2013.01); *G06F 3/1289* (2013.01)

(58) Field of Classification Search
CPC .... G06F 3/1204; G06F 3/1257; G06F 3/1289; G06F 3/1286; H04N 1/32379; H04N 1/32523
USPC ...................................................... 358/1.13
See application file for complete search history.

(56) References Cited

U.S. PATENT DOCUMENTS

| | | | | |
|---|---|---|---|---|
| 2009/0279121 | A1* | 11/2009 | Bostick | G06F 3/1212 358/1.15 |
| 2012/0200877 | A1* | 8/2012 | Kanamori | G06F 3/1206 358/1.13 |
| 2017/0318167 | A1* | 11/2017 | Shimizu | G06F 3/1286 |

FOREIGN PATENT DOCUMENTS

| | | |
|---|---|---|
| JP | 2008102566 A | 5/2008 |
| JP | 5636775 B2 | 12/2014 |

* cited by examiner

*Primary Examiner* — Allen H Nguyen
(74) *Attorney, Agent, or Firm* — ROSSI, KIMMS & McDOWELL LLP

(57) ABSTRACT

An information processing apparatus comprises a determination unit configured to determine whether or not an instruction for printing based on a print job is given by a remote operation, and a decision unit configured to decide one of apparatuses belonging to a local network, to which the information processing apparatus belongs, as a storage destination of the print job in accordance with a result of the determination by the determination unit.

11 Claims, 9 Drawing Sheets

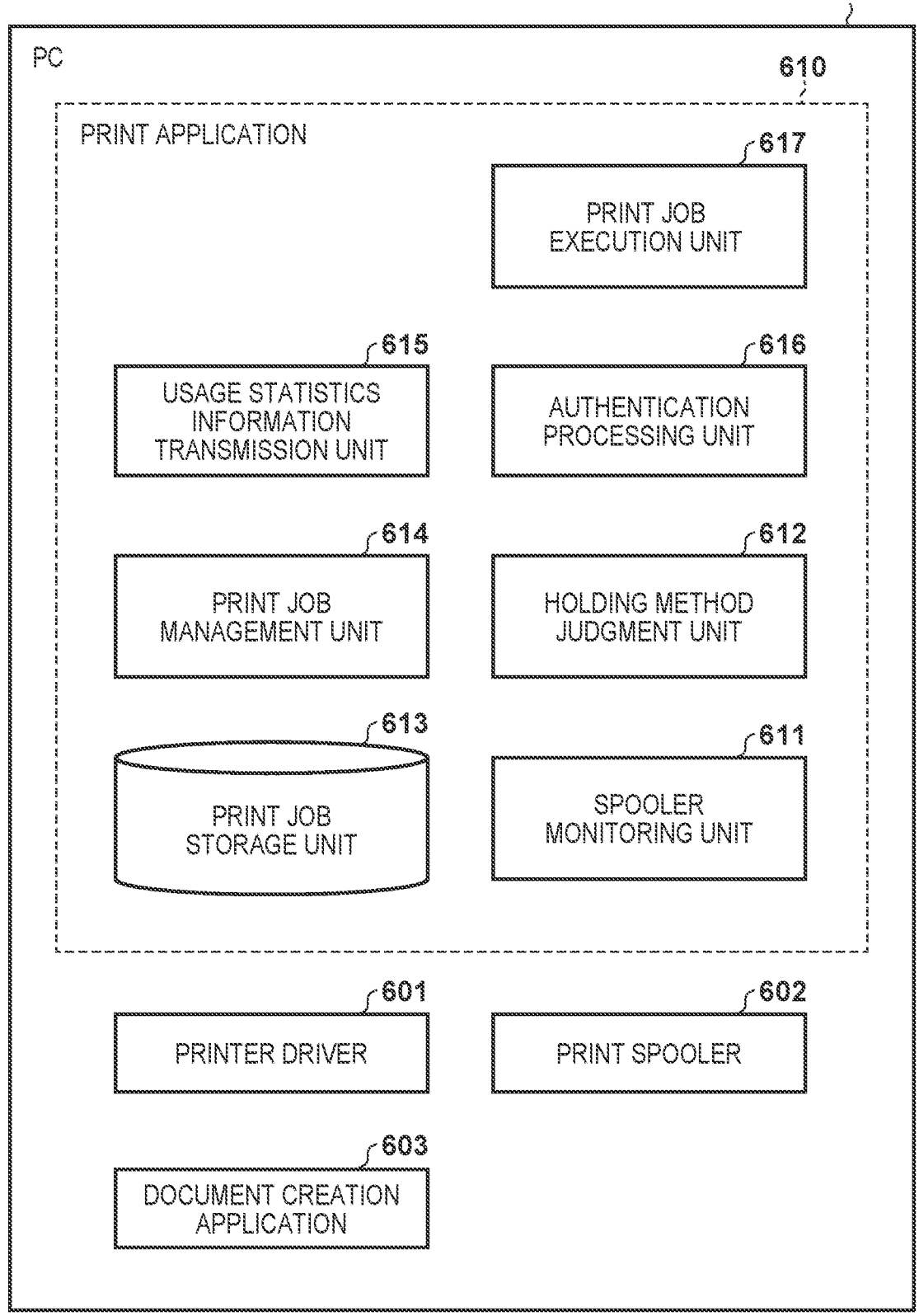

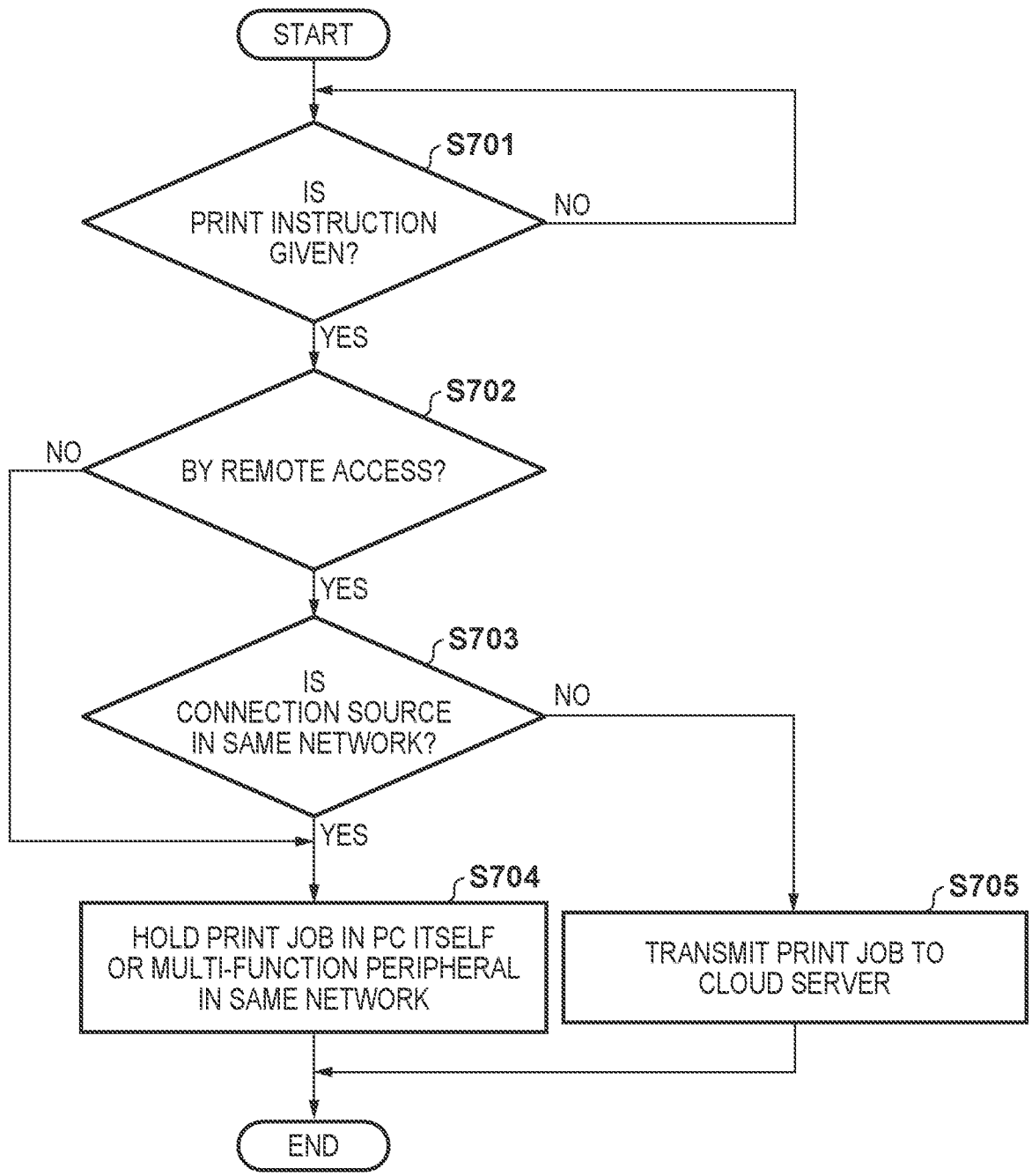

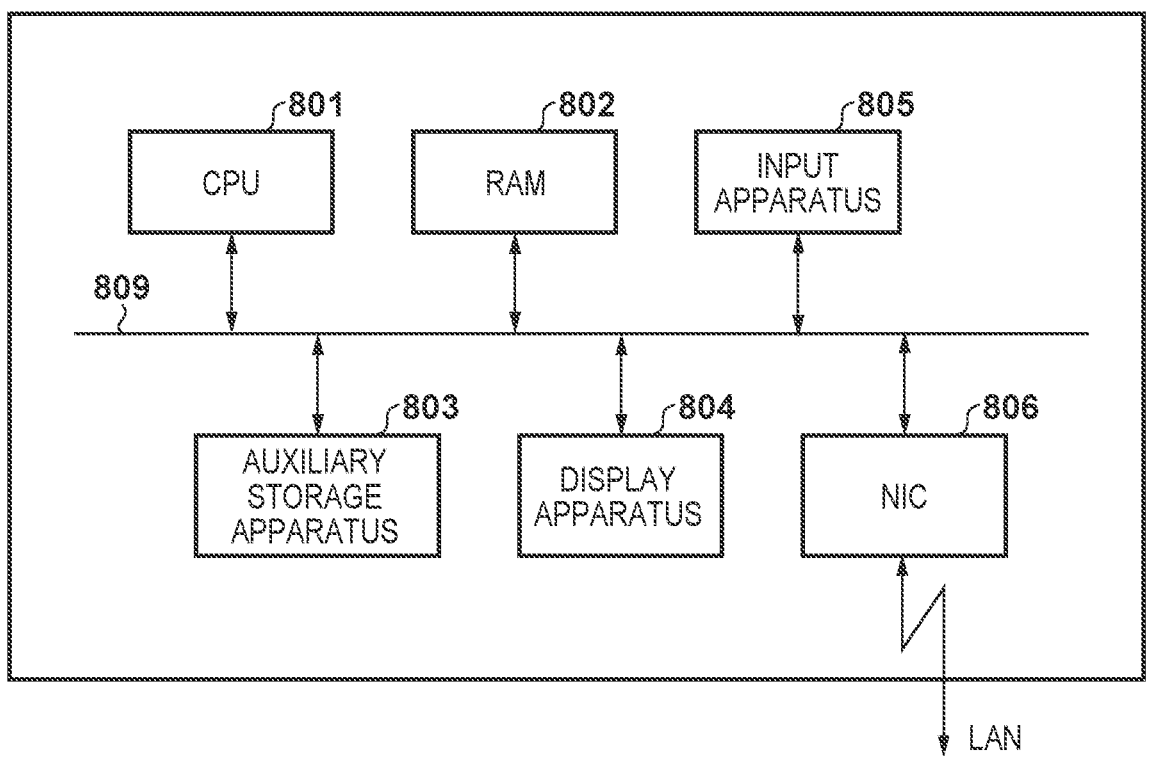

FIG. 9A
PRINTING NOTIFICATION MESSAGE
THERE ARE PRINTABLE JOBS.
| JOB NAME | SHEET SIZE | NUMBER OF PRINT PAGES | NUMBER OF COPIES |
|---|---|---|---|
| Test1.docx | A4 | 1 | 1 |
| Test2.pdf | A3 | 6 | 2 |
| | | | |
| | | | |
| | | | |
| | | | |
| | | | |
[ DELETE ]  [ PRINT ]  [ PRINT ALL ]  [ CANCEL ]
FIG. 9B
SELECT PRINTER ON WHICH TO OUTPUT PRINT JOB.
 Printer 1
 Printer 2
 Printer 3

INFORMATION PROCESSING APPARATUS, INFORMATION PROCESSING METHOD, SYSTEM, AND NON-TRANSITORY COMPUTER-READABLE STORAGE MEDIUM WITH REMOTE OPERATION AND LOCAL NETWORK

BACKGROUND OF THE INVENTION

Field of the Invention

The present invention relates to a technique for holding a print job.

Description of the Related Art

Teleworking, that is, working at home is increasing because it has become possible to operate a personal computer (PC) located at an office from an outside location or from home through a remote desktop or a virtual private network (VPN). Accordingly, there is an increasing need for printing a corporate document even at home.

Conventionally, in the case of printing a corporate document outside an office such as at an outside location or at home, it is necessary to bring the document to be printed from a PC inside an office to a PC outside the office. However, not a few users are reluctant to bring a corporate document to outside the office for security reasons. Therefore, in recent years, there has been proposed a method in which, when a document is brought out from a PC inside an office, not an original document but a document obtained by converting a target document into a page description language is transmitted to a PC outside an office (Japanese Patent Laid-Open No. 2008-102566).

Meanwhile, in order to realize remote printing using hold printing regardless of location, there has been proposed a method in which a multi-function peripheral switches a print server holding a print job in accordance with a user's affiliation. Here, the hold printing is a method in which a print job is stored in a storage area of a multi-function peripheral or the like instead of executing printing upon receipt of the print job, and then the printing is performed when a user gives a print instruction on an operation unit of the multi-function peripheral (Japanese Patent No. 5636775).

However, in Japanese Patent Laid-Open No. 2008-102566, it is not possible to flexibly select a printer (output location) to execute printing. Also, in Japanese Patent No. 5636775, it is necessary to manage user affiliation information or the like and it is necessary to search for a print job, which reduce efficiency.

On the other hand, in recent years, there has been a method of cloud-based hold printing in which a print job is stored in a storage area in a cloud service instead of performing the print job upon receipt of the print job. By using the cloud-based hold printing in which a document is stored in the cloud, the hold printing becomes available not only inside an office but also at an outside location or at home, and thus it is possible to flexibly select an output location. However, even with the cloud-based hold printing, it is not always appropriate to store all print jobs in the cloud. In the case where printing is performed by a printer or a multi-function peripheral located inside an office using a PC inside the office, a traffic is lower and efficiency is higher when a print job is stored inside the office than in the cloud.

Examples of a printing mode similar to the cloud-based hold printing include a cloud printing in which a file stored in a storage in the cloud is printed, and a convenience store printing in which printing is performed by a multi-function peripheral located at a convenience store. However, these involve time and effort because it is troublesome to make settings by an unfamiliar operation, or it is necessary to input a passcode (identifier) on an operation panel of a device. Therefore, it is desirable to seamlessly switch a holding location from a printing system used at an office depending on the status whether or not a user is trying to perform printing to the office from home by a remote operation. However, it takes time and effort for a user to change settings of a holding location depending on use status.

SUMMARY OF THE INVENTION

The present invention provides a technique for switching a holding destination of a print job depending on whether or not a print instruction is given by a remote operation.

According to the first aspect of the present invention, there is provided an information processing apparatus comprising: a determination unit configured to determine whether or not an instruction for printing based on a print job is given by a remote operation; and a decision unit configured to decide one of apparatuses belonging to a local network, to which the information processing apparatus belongs, as a storage destination of the print job in accordance with a result of the determination by the determination unit.

According to the second aspect of the present invention, there is provided an information processing method performed by an information processing apparatus, the method comprising: determining whether or not an instruction for printing based on a print job is given by a remote operation; and deciding one of apparatuses belonging to a local network, to which the information processing apparatus belongs, as a storage destination of the print job in accordance with a result of the determining.

According to the third aspect of the present invention, there is provided a system comprising: at least one information processing apparatus and a multi-function peripheral belonging to a local network; and a cloud server not belonging to the local network, wherein the information processing apparatus includes a determination unit configured to determine whether or not an instruction for printing based on a print job is given by a remote operation, and a decision unit configured to decide any one of the at least one information processing apparatus, the multi-function peripheral, and the cloud server as a storage destination of the print job in accordance with a result of the determination by the determination unit, and the multi-function peripheral includes an acquisition unit configured to acquire the print job of the storage destination, and a printing unit configured to perform printing based on the print job acquired by the acquisition unit.

According to the fourth aspect of the present invention, there is provided a non-transitory computer-readable storage medium storing a computer program for causing a computer of an information processing apparatus to function as a determination unit configured to determine whether or not an instruction for printing based on a print job is given by a remote operation; and a decision unit configured to decide one of apparatuses belonging to a local network, to which the information processing apparatus belongs, as a storage destination of the print job in accordance with a result of the determination by the determination unit.

Further features of the present invention will become apparent from the following description of exemplary embodiments with reference to the attached drawings.

BRIEF DESCRIPTION OF THE DRAWINGS

FIG. 6 is a block diagram illustrating a configuration example of software held by PCs 112 and 122 (and PC 114 in the case of FIG. 5).

FIG. 7 is a flowchart of processing performed by the PC 112 to execute holding processing of a print job.

FIG. 8 is a block diagram illustrating a hardware configuration example of a computer apparatus applicable to the cloud server 130 and the PCs 112 and 122.

FIG. 9A is a diagram illustrating a display example of a GUI.

FIG. 9B is a diagram illustrating a display example of the GUI.

DESCRIPTION OF THE EMBODIMENTS

Figure 1:
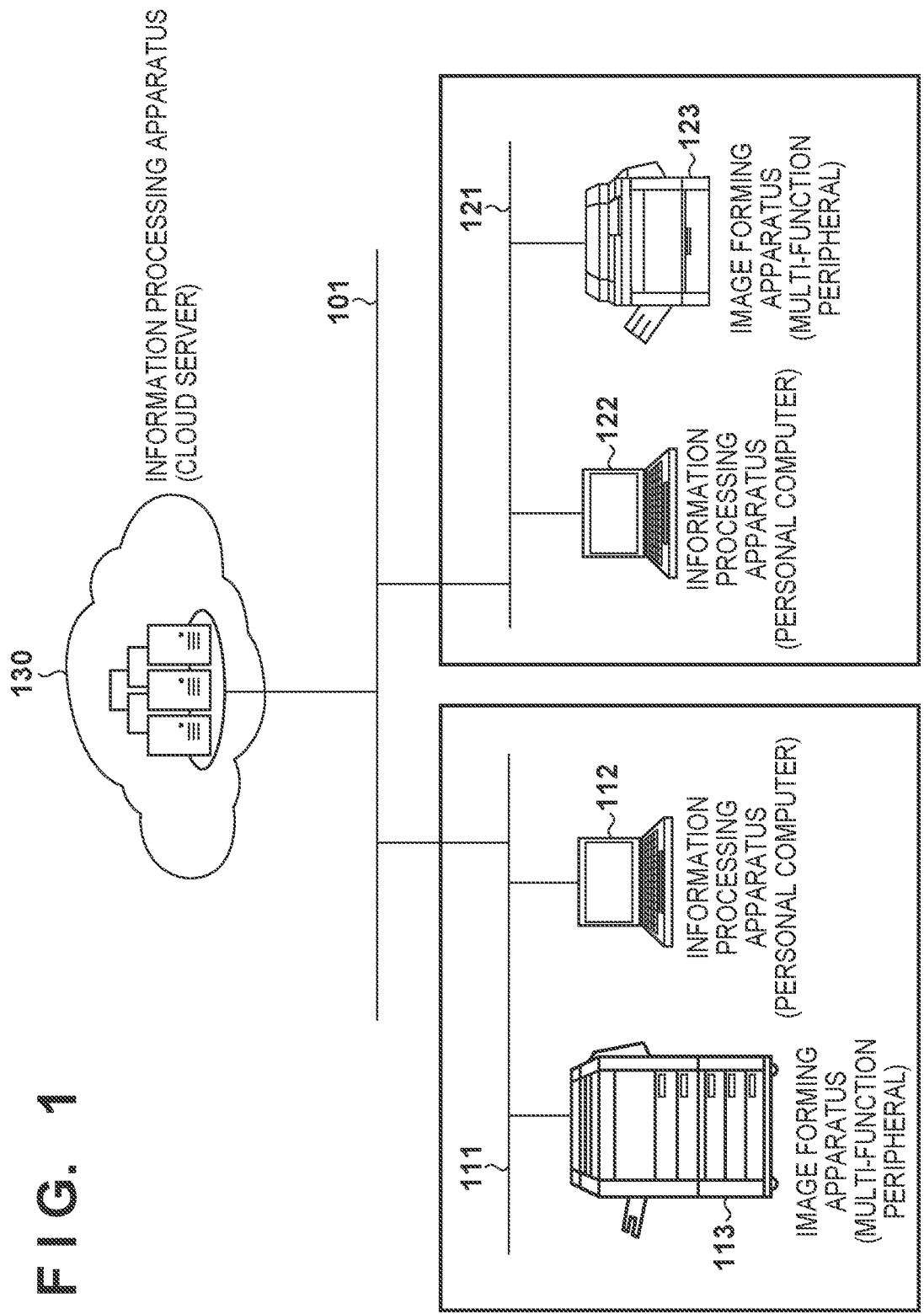
FIG. 1 is a diagram illustrating a configuration example of a system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

System Configuration

First, a configuration example of a system applicable to the present embodiment will be described with reference to FIG. 1. As illustrated in FIG. 1, a network 101 is connected with a cloud server 130 functioning as an information processing apparatus. Further, the network 101 is connected with a local network 111 and a local network 121.

The local network 111 is connected with a multi-function peripheral 113 functioning as an image forming apparatus and a personal computer (PC) 112 functioning as an information processing apparatus. On the other hand, the local network 121 is connected with a multi-function peripheral 123 functioning as an image forming apparatus and a PC 122 functioning as an information processing apparatus.

The network 101, the network 111, and the network 121 are networks supporting, for example, a TCP/IP protocol, and are connected to each other via a router or other peripherals (not illustrated).

When an instruction for printing (print instruction) based on a print job is input by a user, the PCs 112 and 122 determine whether or not the instruction is given by a remote operation, and decide an apparatus in which the print job is to be stored (held) in accordance with the determination result. Then, the PCs 112 and 122 store the print job in the apparatus decided as a holding destination. Hereinafter, a print job collectively refers to print job data that is data of images and characters to be printed, and print job information that is bibliographic information of the print job data (including data storage destination information that is information indicating a holding destination (storage destination) of the print job data). Print job data is, for example, page description language (PDL) data of images and characters to be printed. More specifically, the data storage destination information indicates a storage location (path) of print job data in a storage area of an apparatus that is a holding destination of the print job data.

The PC 112 holds a print job in any of the cloud server 130, and the PC 112 and the multi-function peripheral 113 connected to the local network 111. The PC 122 holds a print job in any of the cloud server 130, and the PC 122 and the multi-function peripheral 123 connected to the local network 121.

The PCs 112 and 122 transmit, to the cloud server 130, storage destination information that is information indicating a holding destination (storage destination) of print job information. More specifically, the storage destination information indicates a storage location (path) of print job information in a storage area of an apparatus that is a holding destination of the print job information.

When authentication information such as a password is input by a user, the multi-function peripheral 113 and 123 conducts authentication of the user (user authentication) using the authentication information in cooperation with the cloud server 130. Upon successful completion of the user authentication, the multi-function peripheral 113 and 123 acquires the storage destination information of the print job information of the user from the cloud server 130. In the case where there are plural pieces of print job information of the user, the storage destination information of respective print job information may indicate different storage destinations. The multi-function peripheral 113 and 123 acquires the print job information from the storage destination indicated by the acquired storage destination information, and acquires the print job data from the storage destination indicated by the data storage destination information included in the acquired print job information. Then, the multi-function peripheral 113 and 123 generates and displays a screen indicating a list of print jobs based on the acquired print job information. The list of print jobs includes various types of information included in the print job information of each print job. The multi-function peripheral 113 and 123 performs printing based on the print job data of the print job selected from the list by the user. The multi-function peripheral 113 and 123 may transmit usage statistics information including the number of sheets printed for the print job and the like to the cloud server 130.

The cloud server 130 unitarily manages information necessary for authenticating users using the multi-function peripherals 113 and 123, storage destination information of print job information of the users, multi-function peripherals and print jobs associated with the users, and the like. Further, the cloud server 130 provides a web browser screen for various settings to the PCs 112 and 122.

Note that, for ease of description, FIG. 1 illustrates a system configuration including one cloud server 130 and two local networks, and each of the local networks includes one PC and one multi-function peripheral. However, these numbers are merely examples, and the respective numbers of PCs and multi-function peripherals included in each local network, the number of local networks, and the number of the cloud servers 130 are not limited to specific numbers.

Hardware Configuration Example of Multi-Function Peripherals 113 and 123

Figure 2:
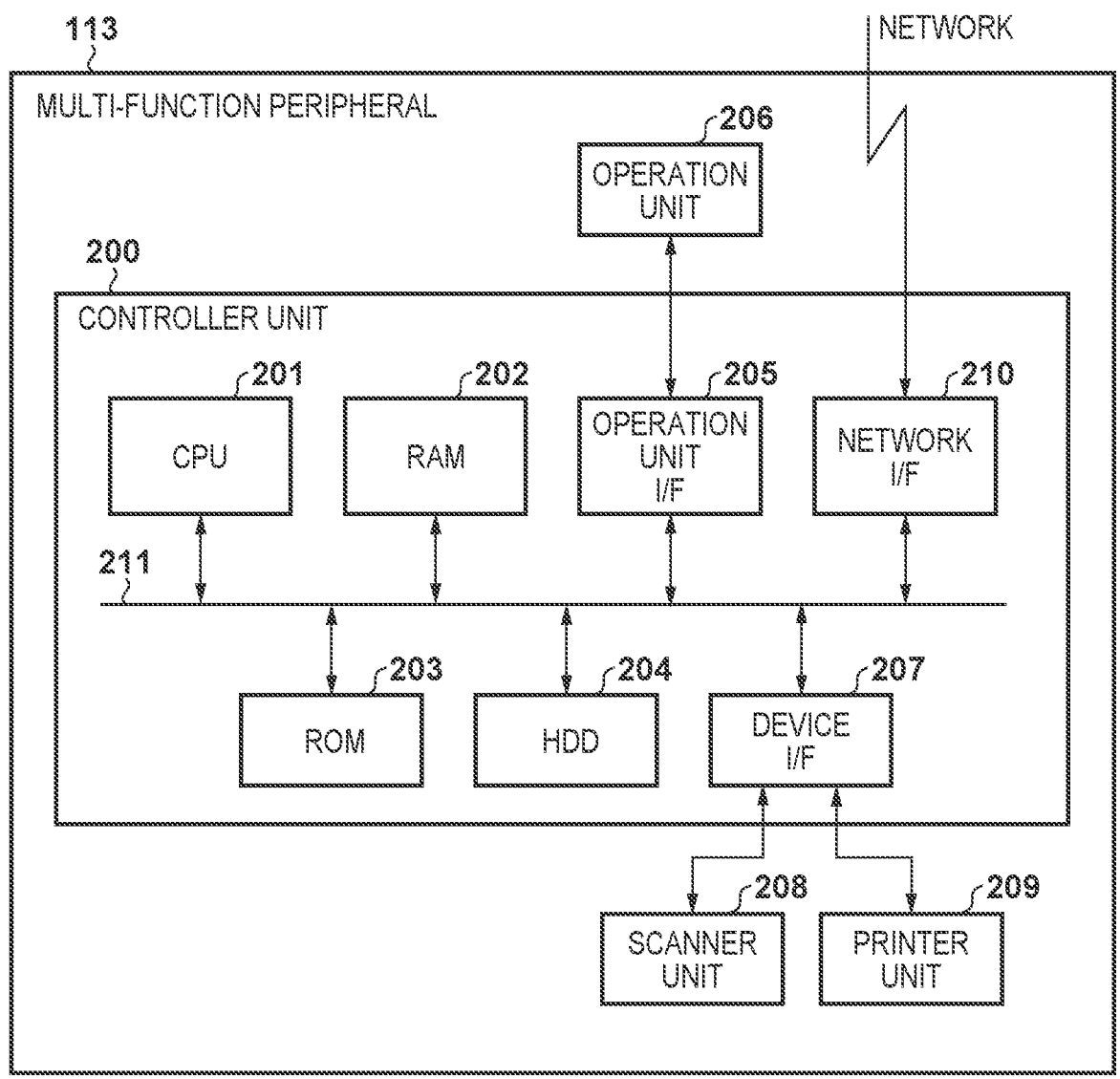
FIG. 2 is a block diagram illustrating a hardware configuration example of a multi-function peripheral 113.

Next, a hardware configuration example of the multi-function peripheral 113 will be described with reference to the block diagram of FIG. 2. In the present embodiment, the multi-function peripheral 113 and the multi-function peripheral 123 have the same hardware configuration, and thus the same description can be applied to the multi-function peripheral 123. However, the multi-function peripheral 113 and the multi-function peripheral 123 do not necessarily have the same hardware configuration, and may have different hardware configurations. As illustrated in FIG. 2, the multi-function peripheral 113 includes a controller unit 200, an operation unit 206, a scanner unit 208, and a printer unit 209.

The controller unit 200 includes a CPU 201, a RAM 202, a ROM 203, an HDD 204, an operation unit I/F 205, a device I/F 207, and a network I/F 210, and each of these unit is connected to a system bus 211.

The CPU 201 executes various types of processing using computer programs and data stored in the RAM 202 or the ROM 203. Accordingly, the CPU 201 controls the operation of the entire multi-function peripheral 113, and executes or controls various types of processing described as being performed by the multi-function peripheral 113.

The RAM 202 includes an area configured to store computer programs and data loaded from the ROM 203 or the HDD 204, and an area configured to store data received from outside via the network I/F 210. The RAM 202 further includes an area configured to store scanned images output from the scanner unit 208 via the device I/F 207, and a work area to be used when the CPU 201 executes various types of processing. As such, the RAM 202 can provide various types of areas as appropriate.

The ROM 203 stores setting data of the multi-function peripheral 113, computer programs and data related to basic operations of the multi-function peripheral 113, computer programs and data related to activation of the multi-function peripheral 113, information necessary for image forming such as fonts, and the like.

The HDD 204 stores an operating system (OS), computer programs and data for causing the CPU 201 to execute or control various types of processing described as being performed by the multi-function peripheral 113, and the like. The computer programs and data stored in the HDD 204 are loaded into the RAM 202 as appropriate under the control of the CPU 201, and are to be processed by the CPU 201.

Note that part of data described as being stored in the HDD 204 may be stored, for example, in the ROM 203 (in the case of a small multi-function peripheral, for example). Also, instead of the HDD 204, a storage apparatus other than a hard disk such as a flash memory including a solid state disk (SSD) may be used.

The operation unit I/F 205 functions as an interface that performs data communication with the operation unit 206 including a touch panel screen. For example, the CPU 201 outputs a screen to be displayed on the operation unit 206 to the operation unit 206 via the operation unit I/F 205. Further, the CPU 201 acquires the content of a user's operation on the operation unit 206 from the operation unit 206 via the operation unit I/F 205.

The operation unit 206 is a user interface including a touch panel screen and various types of buttons, and provides various types of information to a user via the touch panel screen, and receives user's operations on the touch panel screen and the buttons.

The device I/F 207 functions as an interface that performs data communication between the scanner unit 208 and the controller unit 200 as well as between the printer unit 209 and the controller unit 200. For example, the CPU 201 acquires an image, obtained by the scanner unit 208 by scanning a recording medium such as paper, from the scanner unit 208 via the device I/F 207, and stores the acquired image in the RAM 202 or the HDD 204. Note that the CPU 201 may execute an application program stored in the RAM 202 to execute various types of image processing on the acquired image. For example, the CPU 201 outputs print job data to the printer unit 209 via the device I/F 207 to cause the printer unit 209 to execute printing based on the print job data.

The network I/F 210 is connected to the local network 111 connected with the multi-function peripheral 113, and serves as an interface that performs data communication with an accessible device via the local network 111.

Note that the hardware configuration illustrated in FIG. 2 is an example of a configuration applicable to the multi-function peripheral 113, and configurations applicable to the multi-function peripheral 113 is not limited to the configuration illustrated in FIG. 2. For example, the scanner unit 208 may be omitted. Also, in the case of a multi-function peripheral having a facsimile function, the controller unit 200 may include an I/F for a modem so as to enable facsimile transmission by accessing a public communication line via the modem.

Software Configuration Example of Multi-Function Peripherals 113 and 123

Figure 3:
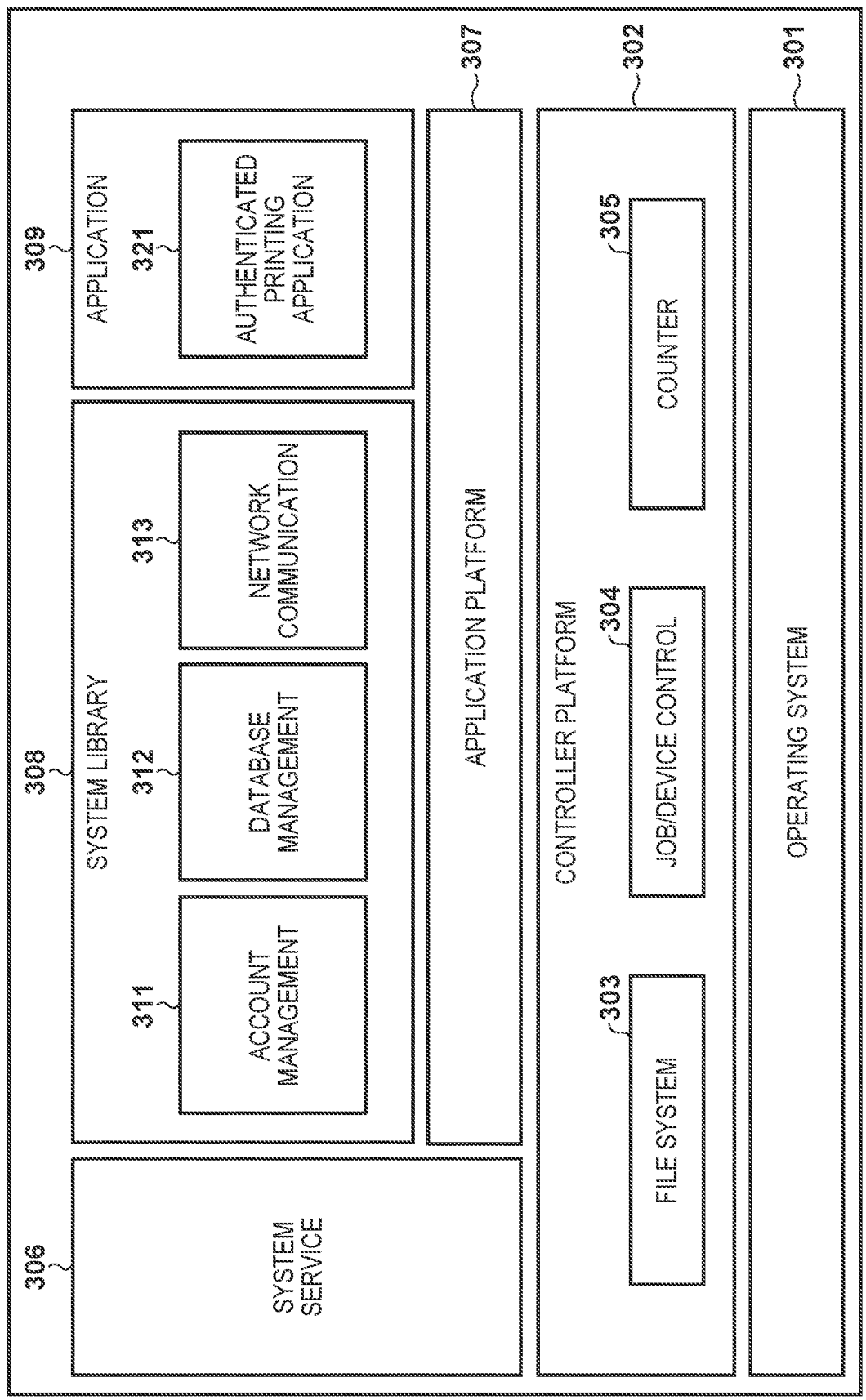
FIG. 3 is a block diagram illustrating a configuration example of software held by the multi-function peripheral 113.

A configuration example of the software (computer program) held by the multi-function peripheral 113 will be described using the block diagram of FIG. 3. In the following, the functional units illustrated in FIG. 3 may be described as main entity for processing, but in practice, the CPU 201 executes the computer program corresponding to each functional unit, thereby achieving the function of each functional unit. The computer program executed by the CPU 201 is implemented as a so-called firmware in the multi-function peripheral 113.

An operating system 301 provides various types of resource management services and frameworks optimized for the control of an embedded system for software working on the system. The various types of resource management services and frameworks provided by the operating system 301 include multi-task management that manages a plurality of executable contexts of processing by the CPU 201 to run plural pieces of processing substantially in parallel, and inter-task communication that realizes synchronization and data exchange between tasks. Furthermore, the operating system 301 provides memory management, interrupt management, various types of device drivers, a protocol stack that is the implementation of processing of various types of protocols including a local interface, a network, and communication, and the like.

A controller platform 302 includes a file system 303, a job/device control 304, and a counter 305. The file system 303 is a mechanism for storing data created in a storage apparatus such as the HDD 204 or the RAM 202, and is used to spool jobs handled by the controller unit 200 and store various types of data. The job/device control 304 controls the hardware of the multi-function peripheral 113 and controls jobs that use basic functions (printing, communication, image conversion, and the like) mainly provided by the hardware. The counter 305 manages an expiration date of each application and counter values based on a print use result.

A system service 306 is a module for monitoring the operating status of the multi-function peripheral 113 and downloading software and licenses from a software distribution server via a network.

An application platform 307 is middleware that makes the mechanisms of the operating system 301 and the controller platform 302 available from a system library 308 and an application 309 described below.

The system library 308 is a software module that provides functions of services available from the application 309, and includes an account management 311, a database management 312, and a network communication 313.

The application 309 is a software module that can display a menu on the touch panel screen included in the operation unit 206 and receive an input from a user, and provides various types of functions executed by the multi-function peripheral 113 to the user.

An authenticated printing application 321 is one part of the application 309, and communicates with an authentication application 410 of the cloud server 130 described below by using the network communication 313 to perform user authentication. For example, the authenticated printing application 321 performs the user authentication by checking authentication information (a user name, a password, and the like) input by the user by operating the operation unit 206 against an account of each user (a user name, a password, and the like) held by the cloud server 130 through communication with the authentication application 410 of the cloud server 130. Other information such as a PIN code may be used as the authentication information and the account. Upon successful completion of the user authentication, the authenticated printing application 321 acquires, from a print management application 414 of the cloud server 130, storage destination information of print job information that is managed by the cloud server 130 in association with the account matching the authentication information. The authenticated printing application 321 acquires the print job information from a storage destination indicated by the acquired storage destination information, and acquires print job data from a storage destination indicated by data storage destination information included in the acquired print job information. Subsequently, the authenticated printing application 321 generates a screen indicating a list of print jobs based on the acquired print job information, and displays the screen on the operation unit 206, as described above. Then, the authenticated printing application 321 instructs the printer unit 209 to perform printing based on print job data of a print job selected by the user from the list, and the printer unit 209 performs the printing based on the print job data of the selected print job.

Hardware Configuration Example of Computer Apparatus Applicable to Cloud Server 130 and PCs 112 and 122

A hardware configuration example of a computer apparatus applicable to the cloud server 130 and the PCs 112 and 122 will be described using the block diagram of FIG. 8. Note that the configuration illustrated in FIG. 8 is an example of a hardware configuration of a computer apparatus applicable to the cloud server 130 and the PCs 112 and 122, and may be varied/modified as appropriate. In addition, all of the cloud server 130, and the PCs 112 and 122 do not necessarily have the same hardware configuration.

A CPU 801 executes various types of processing using computer programs and data stored in a RAM 802. Accordingly, the CPU 801 controls the operation of the entire computer apparatus, and executes or controls various types of processing described as being performed by the cloud server 130, the PC 112, or the PC 122.

The RAM 802 includes an area for storing computer programs and data loaded from an auxiliary storage apparatus 803, and an area for storing data received from outside via an NIC 806. Further, the RAM 802 includes a work area to be used when the CPU 801 executes various types of processing. As described above, the RAM 802 can provide various types of areas as appropriate.

The auxiliary storage apparatus 803 is a large-capacity information storage apparatus such as a hard disk drive. The auxiliary storage apparatus 803 stores an OS, and computer programs and data for causing the CPU 801 to execute or control various types of processing described as being performed by the cloud server 130, the PC 112, or the PC 122.

Figure 4:
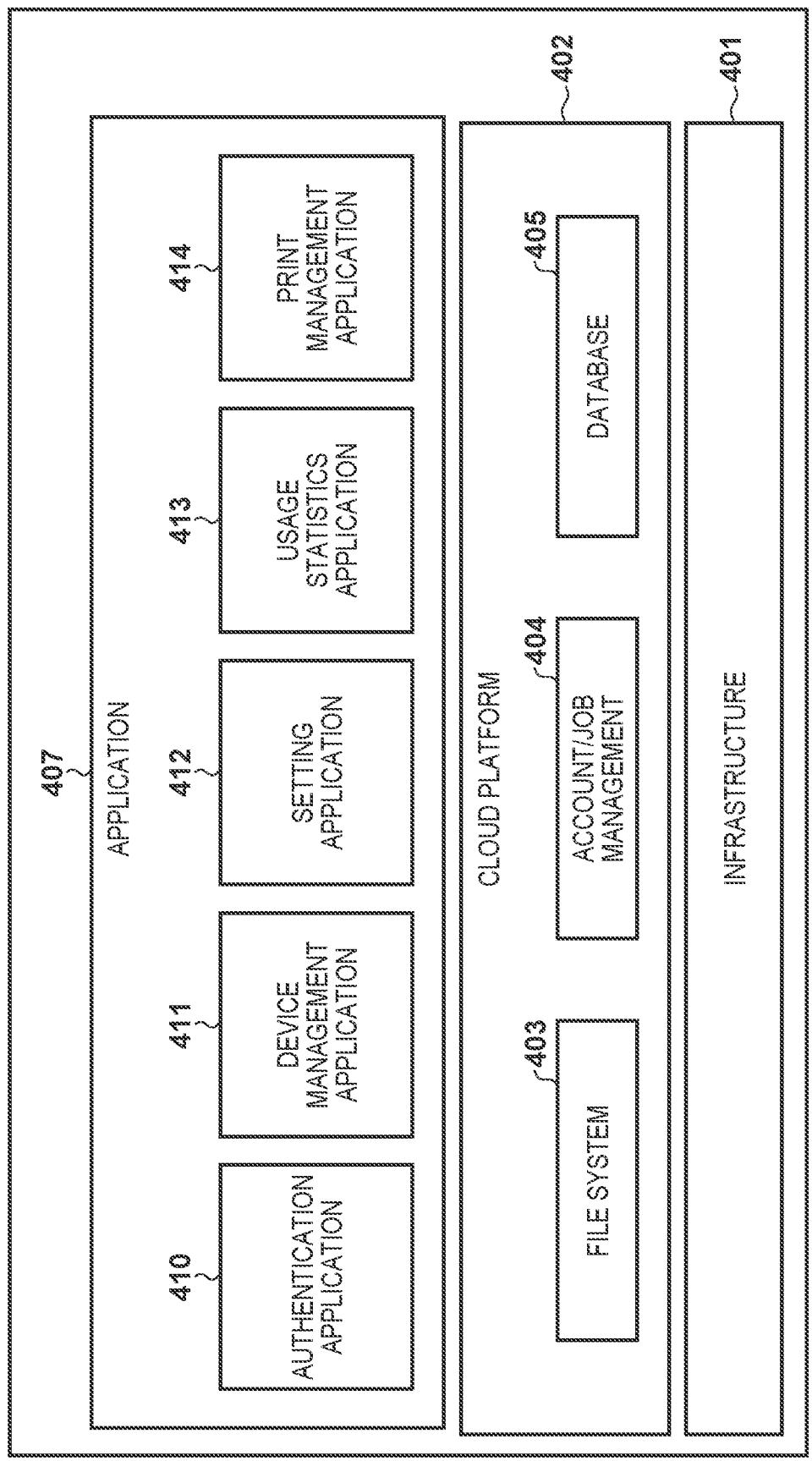
FIG. 4 is a block diagram illustrating a configuration example of software held by a cloud server 130.

The computer programs stored in the auxiliary storage apparatus 803 of the cloud server 130 include a software group illustrated in FIG. 4. Further, the data stored in the auxiliary storage apparatus 803 of the cloud server 130 includes an account of a user who can access the multi-function peripheral 113 and 123 (the user name and the password of the user, and the like), storage destination information corresponding to the account, and print job data and print job information transmitted from the PC 112 or the PC 122 as being held in the cloud server 130.

The computer programs stored in the auxiliary storage apparatus 803 of the PCs 112 and 122 include a software group illustrated in FIG. 6, a computer program of a web browser, and the like. Furthermore, the data stored in the auxiliary storage apparatus 803 of the PCs 112 and 122 includes print job data and print job information input as being held in the PCs 112 and 122.

The computer programs and the data stored in the auxiliary storage apparatus 803 are loaded to the RAM 802 as appropriate under the control of the CPU 801, and are to be processed by the CPU 801.

Note that the auxiliary storage apparatus 803 may be an apparatus that reads out computer programs and data recorded in a storage medium such as a CD-ROM and a DVD-ROM to the RAM 802. In that case, part of the computer programs and the data described above as being stored in the auxiliary storage apparatus 803 is recorded in the storage medium.

A display apparatus 804 is a display apparatus including a liquid crystal screen or a touch panel screen, and can display the results of processing by the CPU 801 using images, characters, or the like. Note that the display apparatus 804 may be a projection apparatus such as a projector which projects images and characters.

An input apparatus 805 is a user interface such as a keyboard, a mouse, and a touch panel screen, and by operating the input apparatus 805, a user can input various types of instructions to the CPU 801.

The NIC 806 is a communication interface for performing data communication with an external apparatus via a network. All of the CPU 801, the RAM 802, the auxiliary storage apparatus 803, the display apparatus 804, the input apparatus 805, and the NIC 806 are connected to a system bus 808.

In addition, in order to enable reading and printing data stored in a flash memory card or the like, the PCs 112 and 122 may include a USB I/F connectable to such a flash memory card.

Software Configuration Example of Cloud Server 130

A configuration example of the software (computer program) held by the cloud server 130 will be described using the block diagram of FIG. 4. In the following, the functional units illustrated in FIG. 4 may be described as main entity for processing, but in practice, the CPU 801 executes the computer program corresponding to each functional unit, thereby achieving the function of each functional unit.

An infrastructure 401 is a foundation for the cloud server 130 to provide services, and includes a server and a virtual machine, a storage, a network and an operating system.

A cloud platform 402 is a framework that uses the infrastructure 401 to provide common fundamental functions to an application 407, and includes a file system 403, an account/job management 404, and a database 405.

The application 407 communicates with a web browser operating in the PCs 112 and 122 to provide a web browser screen (such as a menu display) to the PCs 112 and 122 and receive various types of instructions from the PCs 112 and 122. The application 407 also communicates with the multi-function peripheral 113 and 123 to realize printing based on held print job data. Further, the application 407 manages an account of a user who can access the multi-function peripheral 113 and 123, and visualizes a usage statistic of the multi-function peripheral 113 and 123, and provides various types of functions using the multi-function peripheral 113 and 123 to the user.

The authentication application 410 is one part of the application 407, and uses the account/job management 404, which is the cloud platform 402, to manage a user who can access the multi-function peripheral 113 and 123. Upon receipt of authentication information of a user from the authenticated printing application 321 of the multi-function peripheral 113 and 123, the authentication application 410 determines whether or not there is an account that matches the received authentication information among accounts of respective users managed by the account/job management 404. When the authentication application 410 determines "Yes", the user is determined to be successfully authenticated. Then, the print management application 414 transmits the storage destination information managed (held) in association with the account of the user to the authenticated printing application 321 of the multi-function peripheral 113 and 123.

Note that user authentication may use an external authentication server such as ActiveDirectory and LDAP, instead of the account/job management 404 that is the cloud platform 402.

A device management application 411 is one part of the application 407, and performs device management such as registration, edition, and deletion of the multi-function peripherals 113 and 123 to be connected. In the present embodiment, the multi-function peripherals 113 and 123 are assumed to be registered in the print management application 414.

A setting application 412 is one part of the application 407, and manages setting information used in each application. The setting application 412 is assumed to be set to default values in an initial state.

A usage statistics application 413 is one part of the application 407, and manages statistics information (usage statistics information) of use results of functions such as printing and scanning. The usage statistics information is received from the authenticated printing application 321 of the multi-function peripheral 113 and 123 or a usage statistics information transmission unit 615 of the PCs 112 and 122 to be described later. The usage statistics information is displayed on the web browser of the PCs 112 and 122 for each multi-function peripheral registered in the device management application 411 or for each user registered in the authentication application 410.

The print management application 414 is one part of the application 407, and holds (manages) a print job instructed to be printed by a remote operation (a remote print job) in the account/job management 404. Further, the print management application 414 holds (manages) storage destination information transmitted from the PCs 112 and 122 in association with an account of a user of the PCs 112 and 122 in the account/job management 404. Upon successful completion of user authentication with the multi-function peripheral 113 and 123, the print management application 414 transmits the storage destination information of the print job information, managed in the account/job management 404, in association with the account of the user who has been successfully authenticated, to the authenticated printing application 321 of the multi-function peripheral 113 and 123.

As described above, the authenticated printing application 321 generates a screen indicating a list of print jobs based on the print job information acquired from the storage destination indicated by the storage destination information received from the print management application 414, and displays the screen on the operation unit 206. Then, the authenticated printing application 321 causes the printer unit 209 to execute printing based on print job data of a print job selected by the user from the list.

This provides a remote printing function that enables any multi-function peripheral connected to the cloud server 130 to execute printing regardless of from which PC a print job is transmitted. In addition, upon receipt of the storage destination information of the print job information, the print management application 414 can also transmit the storage destination information of the print job information to a print job execution unit 617 of a print application 610 of a PC currently being logged in by the user corresponding to the print job information. Accordingly, the print job execution unit 617 of the print application 610 of the PC can cause even a multi-function peripheral (including a printer), which cannot directly release a temporarily held print job, to execute printing based on the print job.

Network Configuration Example of System

Figure 5:
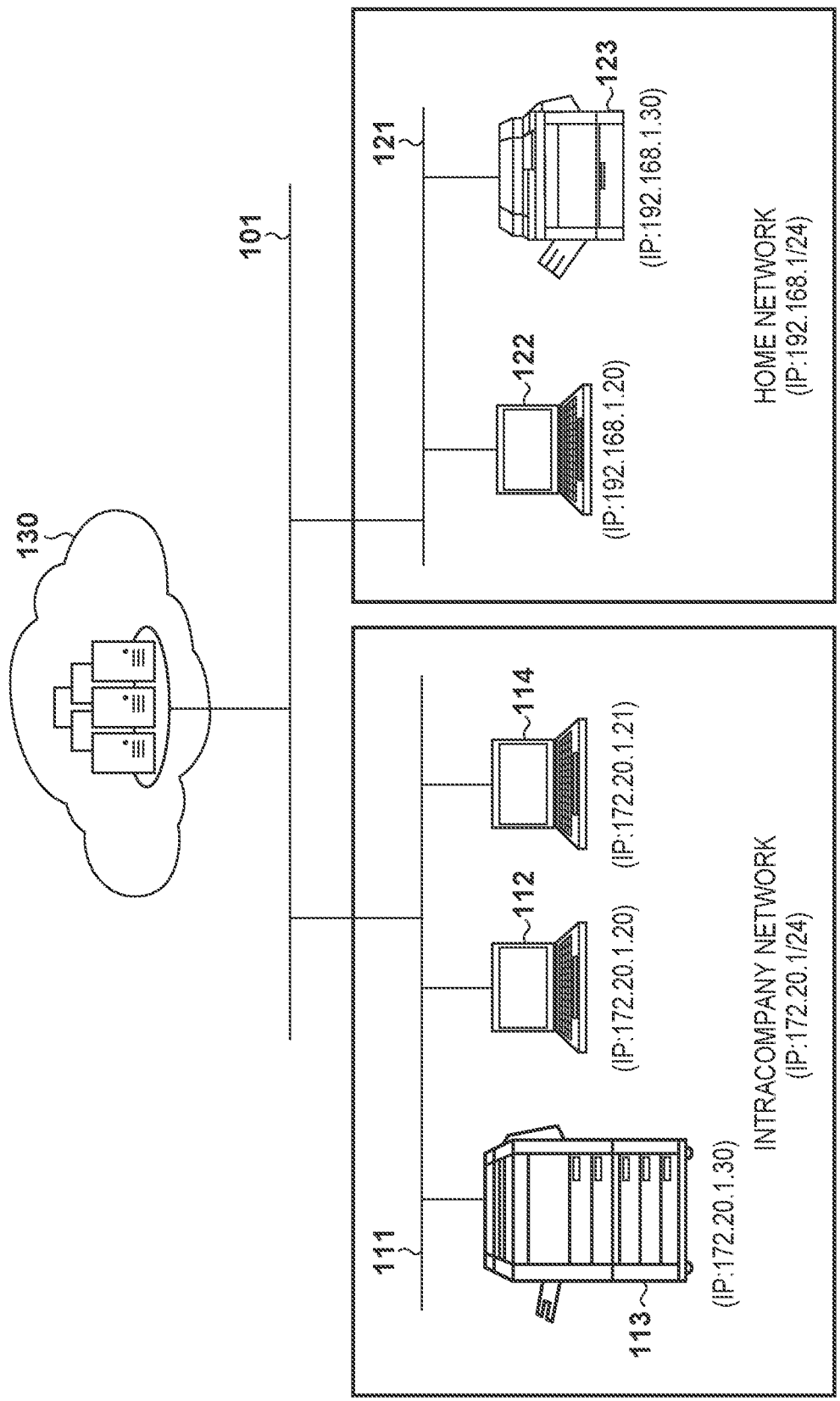
FIG. 5 is a diagram illustrating a configuration example of a network of the system.

Next, a network configuration example of a system according to the present embodiment will be described with reference to FIG. 5. In FIG. 5, a PC 114 is only added to the local network 111 in the system of FIG. 1, and the functions of the respective apparatus are as described above. Here, for example, the local network 111 is referred to as an "intracompany network", and the local network 121 is referred to as a "home network".

The PC 112 is assumed to be a portable PC (such as a notebook computer). The PC 112 is usually connected to the local network 111 (IP address=172.20.1/24), but may be carried about and connected to the local network 121 (IP address=192.168.1/24) for the purpose of teleworking.

FIG. 5 illustrates a state in which the PC 112, the PC 114, and the multi-function peripheral 113 are connected to the intracompany network and assigned IP addresses "172.20.1.20", "172.20.1.21", and "172.20.1.30", respectively. Further, FIG. 5 illustrates a state in which the PC 122 and the multi-function peripheral 123 are connected to the home network and assigned IP addresses "192.168.1.20" and "192.168.1.30", respectively.

As described above, the multi-function peripheral 123 to which the IP address=192.168.1.30 is assigned is connected to the home network, and can be connected with the PC 122 by communication within the home network. In addition, the multi-function peripheral 123 can communicate with the cloud server 130 via the network 101. The multi-function peripheral 123 is assumed to be installed at a location such as a user's home that cannot be accessed by other users.

On the other hand, the multi-function peripheral 113 to which the IP address=172.20.1.30 is assigned is connected to the intracompany network, and can be connected with the PC 112 and the PC 114 by communication within the intracompany network. Further, the PC 112 and the PC 114 can communicate with each other within the intracompany network, and the PC 114 is installed as a PC that is connected to the PC 112 by remote login and uses the PC 112 by a remote operation.

Software Configuration Example of PCs 112 and 122

A software configuration example of software (a computer program) held by the PCs 112 and 122 (and the PC 114 in the case of FIG. 5) will be described using the block diagram of FIG. 6. In the following, the functional units illustrated in FIG. 6 may be described as main entity for processing, but in practice, the CPU 801 executes the computer program corresponding to each functional unit, thereby achieving the function of each functional unit.

Note that the PCs 112 and 122 do not have to include all the functions illustrated in FIG. 6. For example, the usage statistics information transmission unit 615 and the print job execution unit 617 may be omitted as necessary, or the configuration of FIG. 6 may be implemented by two or more PCs.

Here, in order to give a concrete description, a case will be described in which, taking the PC 112 as an example, the PC 122 remotely connects to the PC 112, and remotely operates the PC 112 to give a print instruction. The following description is similarly applicable to any PC that belongs to the same local network.

The print application 610 is an application for holding print jobs and executing printing based on a print job selected by a user from the held print jobs according to the present embodiment. The print application 610 is installed in the auxiliary storage apparatus 803 of the PCs 112 and 122.

As illustrated in FIG. 6, a printer driver 601, a print spooler 602, and a document creation application 603 are not included in the print application 610. The print spooler 602 is provided in the OS included in the PC 112, and the printer driver 601 is separately installed in accordance with a use environment. The document creation application 603 is illustrated as an example of an application that can create contents such as documents and images and instruct printing of the contents, and may be another application (not illustrated) as long as the application can instruct printing of the contents.

A spooler monitoring unit 611 monitors the input of print job data from the printer driver 601 to the print spooler 602. Print job data is input to the print spooler 602 via the printer driver 601 in response to a user's operation on the input apparatus 805 to input a print instruction to the document creation application 603. The spooler monitoring unit 611 determines whether or not the print job data input to the print spooler 602 is print job data to be monitored by the print application 610 by referring to a parameter or the like of the print job data. When the spooler monitoring unit 611 determines that the print job data input to the print spooler 602 is print job data to be monitored by the print application 610, the spooler monitoring unit 611 notifies a holding method judgment unit 612 of the determination. Whether or not print job data input to the print spooler 602 is print job data to be monitored is determined by, for example, whether or not a name of a predetermined multi-function peripheral is included in the parameter of the input print job data.

The holding method judgment unit 612 decides respective holding destinations of the print job data determined as being print job data to be monitored by the spooler monitoring unit 611 and print job information corresponding to the print job data.

Here, processing for deciding a holding destination of a print job (print job data and print job information) performed by the holding method judgment unit 612 will be described. In the case of FIG. 5, the PC 112 decides any one of the cloud server 130 and the apparatuses on the local network 111 (PCs 112 and 114) as a holding destination of the print job. For example, assume that the PC 122 remotely connects to the PC 112 via a virtual private network (VPN), a remote desktop, or the like and gives a print instruction to the PC 112 (outputs a print job to the PC 112) by a remote operation. In this case, the holding method judgment unit 612 acquires login information (an account input by the user at the time of login) of the user who has given the print instruction with the document creation application 603 on the PC 112. Further, the holding method judgment unit 612 acquires a user list in which accounts of currently logged-in users who are remotely accessing the PC 112 are registered. When the account of the user who has given the print instruction is included in the user list, the holding method judgment unit 612 determines that the print instruction is given by a remote operation. Note that methods for determining whether or not a print instruction is given by a remote operation is not limited to a specific determination method. When the print instruction is determined to be given by a remote operation, the holding method judgment unit 612 acquires the IP address of the PC 122 and compares the acquired IP address to the IP address of the PC 112. In the case of FIG. 5, the PC 112 belongs to the intracompany network (IP address is "172.20.1/24"), and the PC 122 belongs to the home network (IP address is "192.68.1/24"). That is, the IP address of the PC 122 differs from the IP address of the PC 112, and thus the holding method judgment unit 612 determines that the remote operation for the print instruction from the PC 122 to the PC 112 has been performed between the local networks different from each other. In this case, since there is a possibility that printing may be performed at a remote location such as a home, the holding method judgment unit 612 decides the cloud server 130 as a holding destination of the print job (print job data and print job information). Whether the IP addresses of the PC 112 and the PC 122 are identical to or different from each other is determined by comparing respective network portions of the IP addresses of the PC 112 and the PC 122. When the respective network portions of the IP addresses of the PC 112 and the PC 122 are identical to each other, it is determined that the PC 112 and the PC 122 belong to an identical local network. On the other hand, when the respective network portions of the IP addresses of the PC 112 and the PC 122 are different from each other, it is determined that the PC 112 and the PC 122 belong to different local networks.

Meanwhile, assume that the PC 114 belonging to the same local network as the PC 112 is remotely logged in to the PC 112 and gives a print instruction to the PC 112 (outputs a print job to the PC 112) by a remote operation. In this case, since respective network portions of the IP addresses of the PC 112 and the PC 114 are found to be identical to each other by comparison, it is determined that the PC 112 and the PC 114 belong to an identical local network. In this case, the holding method judgment unit 612 decides an apparatus on the local network 111, that is, the PC 112 or the multi-function peripheral 113 as a holding destination of the print job (print job data and print job information).

There is a variety of methods for deciding which one of the PC 112 and the multi-function peripheral 113 is made to be a holding destination of the print job. Examples of respective methods for deciding a holding destination of print job data and a holding destination of print job information will be described below.

For example, a holding destination of print job data is decided by referring to "setting information of a holding destination of printing job data" managed by the setting application 412 of the cloud server 130 and in accordance with the setting information referred to. For example, in the case where the PC 112 is set as a holding destination of the print job data in the setting information, the holding method judgment unit 612 decides the PC 112 as a holding destination of the print job data. On the other hand, in the case where the multi-function peripheral 113 is set as a holding destination of the print job data in the setting information, the holding method judgment unit 612 decides the multi-function peripheral 113 as a holding destination of the print job data. In this case, the holding method judgment unit 612 may decide either one of the PC 112 and the multi-function peripheral 113 as a holding destination of the print job information. In other words, the holding method judgment unit 612 may decide an apparatus that is a holding destination of print job data as a holding destination of print job information, or may decide the other apparatus different from the apparatus that is a holding destination of print job data as a holding destination of print job information. In addition, for example, the holding method judgment unit 612 may decide an apparatus, which has been decided as a holding destination of a print job for a user immediately before, as a holding destination of a print job subsequently input by the same user.

In this manner, by deciding which one of the apparatuses in the identical local network is used as a holding destination of print job data in accordance with the setting information, the print job data can be held, for example, as usual for a user. The setting information may be set by an administrator by operating the input apparatus 805 on the cloud server 130 side. Alternatively, the setting information may be set by a user of the PCs 112 and 122 via a web browser screen provided by the cloud server 130.

A print job management unit 614 generates print job data, and transmits the generated print job data to the holding destination decided as a holding destination of the print job data by the holding method judgment unit 612. A holding destination apparatus stores (holds) the received print job data in "the holding destination (path) of the print job data decided by the holding method judgment unit 612" in a memory (the HDD 204, the auxiliary storage apparatus 803, or the like) of the holding destination apparatus.

Further, the print job management unit 614 generates print job information including at least data storage destination information indicating "the holding destination of the print job data" decided by the holding method judgment unit 612 and information regarding the owner of the print job. Then, the print job management unit 614 transmits the generated print job information to the holding destination decided as a holding destination of the print job information by the holding method judgment unit 612. A holding destination apparatus stores (holds) the received print job information in "the holding destination (path) of the print job information decided by the holding method judgment unit 612" in a memory (the HDD 204, the auxiliary storage apparatus 803, or the like) of the holding destination apparatus.

Furthermore, the print job management unit 614 generates holding destination information indicating "the holding destination of the print job information" decided by the holding method judgment unit 612, and transmits the generated storage destination information to the print management application 414 of the cloud server 130. The print management application 414 of the cloud server 130 holds (manages) the received storage destination information in the account/job management 404 in association with the account of the user who has given the print instruction with the document creation application 603 on the PC 112.

Upon receipt of usage statistics information from the multi-function peripheral 113 and 123, the usage statistics information transmission unit 615 transfers the usage statistics information to the usage statistics application 413 of the cloud server 130. Usage statistics information is acquired by acquiring the usage statistics information of the device that has executed printing via the print job management unit 614 or the print job execution unit 617 from the job/device control 304 or the counter 305. Note that the authenticated printing application 321 of the multi-function peripheral 113 and 123 described above also transmits the usage statistics information of the multi-function peripheral 113 and 123 to the cloud server 130. Thus, there may be a configuration in which either the authenticated printing application 321 or the usage statistics information transmission unit 615 is not present.

By collecting the usage statistics information in the cloud server 130, it is possible to achieve a seamless printing environment in which a multi-function peripheral (printer) can be used even at home by an operation habitually used at an office. In addition to the above, there is an effect that usage statistics information such as who has performed printing, from where printing has been performed, how many sheets have been printed, and the like can be unitarily managed regardless of at home or at an office.

An authentication processing unit 616 functions for the print application 610 to perform log-in authentication to the authentication application 410 of the cloud server 130. An account of a user who will perform the log-in authentication is registered in advance in the account/job management 404 of the cloud server 130, and through this authentication processing, an owner of a print job handled by the print application 610 is associated with an account managed by the cloud server 130. A user name and a password for the log-in authentication are input at the time of installation of the print application 610, and information of an authenticated account is stored in a storage area of the authentication processing unit 616.

The print job execution unit 617 is a functional unit for causing a multi-function peripheral (printer) that does not have a configuration for directly releasing held print job data (executing printing) to execute printing. The print job execution unit 617 has a function equivalent to the authenticated printing application 321 so as to realize printing based on print job data.

Small devices such as home printers may not include a function like the authenticated printing application 321 due to hardware constraints, or the like. A concrete processing procedure of the print job execution unit 617 is as follows. The print job execution unit 617 receives storage destination information associated with an account of a currently logged-in user from the print management application 414 of the cloud server 130, and acquires print job information from the storage destination indicated by the storage destination information. Then, the print job execution unit 617 displays (provides the user with) a list of print jobs based on the acquired print job information on the display apparatus 804 and waits for an instruction from the user. When a print instruction based on a desired print job in the list is input by the user, print job data is acquired from a storage destination indicated by data storage destination information included in the print job information of the desired print job. Then, the acquired print job data is input to the printer driver 601. The print job data input to the printer driver 601 is output to a small device such as a home printer via the print spooler 602, and causes the small device to execute printing based on the print job data.

A print job storage unit 613 stores (holds) print job data and print job information, which have been determined to be held in the PC 112, in the RAM 802 or the auxiliary storage apparatus 803 of the PC 112.

Print Job Holding Processing

Processing performed by the PC 112 to execute print job holding processing will be described according to the flowchart of FIG. 7. The processing according to the flowchart of FIG. 7 is implemented when the CPU 801 of the PC 112 executes the print application 610. Note that the processing according to the flowchart of FIG. 7 is executed in a similar way in other PCs.

In step S701, the spooler monitoring unit 611 determines whether or not print job data input from the printer driver 601 to the print spooler 602 is print job data to be monitored by the print application 610 (print job data for which a print instruction has been given).

As a result of the determination, when the input print job data is subject print job data of monitoring by the print application 610, the spooler monitoring unit 611 notifies the holding method judgment unit 612 that the input print job data is subject print job data of monitoring by the print application 610. Then, the processing proceeds to step S702.

On the other hand, when the input print job data is not subject print job data of monitoring by the print application 610, the processing waits in step S701.

In step S702, the holding method judgment unit 612 determines whether or not a print instruction based on the print job data is given by a remote operation (remote access) from a PC other than the PC 112, as described above.

As a result of the determination, when it is determined that the print instruction based on the print job data is given by a remote operation (remote access), the processing proceeds to step S703. On the other hand, when it is determined that the print instruction based on the print job data is given not by a remote operation (remote access), the processing proceeds to step S704.

In step S703, the holding method judgment unit 612 determines whether or not a PC performing the remote operation (the PC other than the PC 112) and the PC 112 belong to an identical local network, as described above.

As a result of the determination, when it is determined that the PC performing the remote operation (the PC other than the PC 112) and the PC 112 belong to the identical local network, the processing proceeds to step S704. On the other hand, when the PC performing the remote operation (the PC other than the PC 112) and the PC 112 belong to different local networks, the processing proceeds to step S705.

In the case where the processing proceeded from step S703 to step S704, in step S704, the holding method judgment unit 612 decides either the PC 112 or the multi-function peripheral 113 as a holding destination for each of the print job data and the print job information, as described above. As in the case where the processing proceeded from step S703 to step S704, in the case where the processing proceeded from step S702 to step S704, in step S704, the holding method judgment unit 612 decides a holding destination for each of the print job data and the print job information.

Further, in step S704, the print job management unit 614 generates print job data, and transmits the generated print job data to the holding destination decided as a holding destination of the print job data. Further, the print job management unit 614 generates print job information, and transmits the generated print job information to the holding destination decided as a holding destination of the print job information. Furthermore, the print job management unit 614 generates storage destination information of the print job information, and transmits the generated storage destination information to the cloud server 130.

Meanwhile, in step S705, the holding method judgment unit 612 decides the cloud server 130 as a holding destination of the print job (print job data and print job information). Further, in step S705, the print job management unit 614 generates print job data, and transmits the generated print job data to the cloud server 130 decided as a holding destination of the print job data. Further, the print job management unit 614 generates print job information, and transmits the generated print job information to the cloud server 130 decided as a holding destination of the print job information. Furthermore, the print job management unit 614 generates storage destination information of the print job information, and transmits the generated storage destination information to the cloud server 130.

As described above, according to the present embodiment, since a holding destination of a print job is switched depending on whether or not a print instruction is given by a remote operation, it is possible to reduce time and effort for a user to change settings of the holding destination of the print job. Further, according to the present embodiment, in the case where a remote operation for a print instruction is performed in an identical local network, an apparatus belonging to the same local network as a multi-function peripheral (an apparatus relatively close to the multi-function peripheral) is set as a holding destination. Therefore, it is possible to reduce traffic and user's waiting time during execution of printing.

Second Embodiment

In the present embodiment, differences from the first embodiment will be described, and it is assumed that the present embodiment is similar to the first embodiment unless otherwise specified. Unlike the multi-function peripherals 113 and 123, some home multi-function peripherals and printers do not have a configuration for executing printing (release) based on held print job data, that is, the function of the authenticated printing application 321. Therefore, in the present embodiment, a system for realizing printing based on held print job data using a multi-function peripheral or a printer that does not have the function of the authenticated printing application 321 will be described. Hereinafter, such "a home multi-function peripheral or a printer" is collectively referred to as a "printing apparatus".

FIG. 9A illustrates a display example of a graphical user interface (GUI) that is displayed on the display apparatus 804 of the PCs 112 and 122 to realize printing based on held print job data using a printing apparatus that does not have a function to execute printing based on held print job data.

The print job execution unit 617 of the PCs 112 and 122 acquires storage destination information associated with an account of a currently logged-in user from the print management application 414 of the cloud server 130. Then, the print job execution unit 617 acquires print job information stored in a storage destination indicated by the acquired storage destination information, and generates a list of print jobs based on the acquired print job information. A print job list 901 in FIG. 9A is a list of print jobs generated by the print job execution unit 617 based on the print job information. The print job list 901 includes, for each print job, a name (job name) of the print job and print settings (a sheet size, number of sheets to be printed, and number of copies to be printed) of the print job.

Assume that the user specifies a location corresponding to a desired print job by touching the screen of the display apparatus 804 or operating the input apparatus 805, and then selects a "Delete" button 902. In this case, the print job execution unit 617 instructs an apparatus that is a storage destination of the desired print job to delete the desired print job (print job data and print job information). The apparatus that has received this instruction deletes the desired print job.

Assume that the user specifies a location corresponding to a desired print job by touching the screen of the display apparatus 804 or operating the input apparatus 805, and then selects a "Print" button 903. In this case, the print job execution unit 617 causes the display apparatus 804 to display the GUI illustrated in FIG. 9B. FIG. 9B illustrates a list of printing apparatuses (printers in FIG. 9B) registered in the device management application 411 of the cloud server 130. This list includes printer names "Printer 1", "Printer 2", and "Printer 3". Assume that the user selects one of the printing apparatuses (printer names) included in the list as a selected multi-function peripheral by touching the screen of the display apparatus 804 or operating the input apparatus 805. In this case, the print job execution unit 617 acquires print job data from a storage destination indicated by data storage destination information included in print job information of the desired print job, and inputs the acquired print job data to the printer driver 601. The print job data is transmitted to the selected multi-function peripheral via the printer driver 601 and the print spooler 602, and the selected multi-function peripheral executes printing based on the print job data of the desired print job.

Assume that the user selects a "Print all" button 904 by touching the screen of the display apparatus 804 or operating the input apparatus 805. In this case, the print job execution unit 617 causes the display apparatus 804 to display the GUI illustrated in FIG. 9B. Assume that the user selects one of the multi-function peripherals included in the list as a selected multi-function peripheral by touching the screen of the display apparatus 804 or operating the input apparatus 805. In this case, the print job execution unit 617 acquires print job data from a storage destination indicated by data storage destination information included in print job information of every print job included in the print job list 901, and inputs the acquired print job data to the printer driver 601. The print job data is transmitted to the selected multi-function peripheral via the printer driver 601 and the print spooler 602, and the selected multi-function peripheral executes printing based on the print job data of the desired print jobs.

When the user selects a "Cancel" button 905 by touching the screen of the display apparatus 804 or operating the input apparatus 805, the print job execution unit 617 closes the GUI of FIG. 9A and clear a display of the GUI from the display screen of the display apparatus 804.

Note that the functions of the PCs 112 and 122 according to the present embodiment can be realized also by a computer apparatus such as a smartphone or a tablet terminal apparatus. Thus, a local network may include such a computer apparatus in addition to or instead of the PCs 112 and 122.

As described above, according to the present embodiment, even a multi-function peripheral or a printer that does not have a configuration for executing printing (release) based on held print job data can realize printing based on held print job data.

The numerical values, processing timings, processing orders, processing entities, and data (information) transmission destinations/transmission sources/storage locations, and the like used in the embodiments described above are referred to for specific description as an example, and are not intended to limit the present invention to these examples.

Some or all of the embodiments described above may be used in combination as appropriate. Alternatively, some or all of the embodiments described above may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-146349, filed Sep. 8, 2021, which is hereby incorporated by reference herein in its entirety.

What is claimed is:

1. An information processing apparatus comprising:
a determination unit configured to determine whether or not an instruction for printing based on a print job is given by a remote operation; and
a decision unit configured to decide one of apparatuses belonging to a local network, to which the information processing apparatus belongs, as a storage destination of the print job in accordance with a result of the determination by the determination unit.

2. The information processing apparatus according to claim 1, wherein, when the instruction is determined to be given not by a remote operation, the decision unit decides any of apparatuses belonging to a local network, to which the information processing apparatus belongs, as a storage destination of the print job.

3. The information processing apparatus according to claim 1, wherein, when the instruction is determined to be given by a remote operation from another information processing apparatus belonging to the local network, the decision unit decides any of apparatuses belonging to a local network, to which the information processing apparatus belongs, as a storage destination of the print job.

4. The information processing apparatus according to claim 2, wherein the decision unit decides as a storage destination of print job data, among apparatuses belonging to a local network to which the information processing apparatus belongs, an apparatus set in advance as a storage destination of the print job data, and decides any of the apparatuses belonging to the local network, to which the information processing apparatus belongs, as a storage destination of print job information including the storage destination of the print job data.

5. The information processing apparatus according to claim 1, wherein, when the instruction is determined to be given by a remote operation from an information processing apparatus belonging to another local network different from the local network, the decision unit decides a cloud server belonging to neither the local network nor the other local network different from the local network as a storage destination of the print job.

6. The information processing apparatus according to claim 5, wherein, when the instruction is determined to be given by a remote operation from an information processing apparatus belonging to another local network different from the local network, the decision unit decides a cloud server belonging to neither the local network nor the other local network different from the local network as a storage destination of print job information including print job data and a storage destination of the print job data.

7. The information processing apparatus according to claim 4, further comprising
a unit configured to transmit the print job data to the storage destination of the print job data, transmit the print job information to the storage destination of the print job information, and transmit information indicating the storage destination of the print job information to a cloud server belonging to neither the local network nor another local network different from the local network.

8. The information processing apparatus according to claim 7, further comprising
a unit configured to acquire information indicating the storage destination of the print job information, acquire the print job information based on the information, provides a screen indicating a list of print jobs based on the print job information, and output print job data of a print job selected by a user from the list to a printing apparatus.

9. An information processing method performed by an information processing apparatus, the method comprising:
determining whether or not an instruction for printing based on a print job is given by a remote operation; and
deciding one of apparatuses belonging to a local network, to which the information processing apparatus belongs, as a storage destination of the print job in accordance with a result of the determining.

10. A system comprising:
at least one information processing apparatus and a multi-function peripheral belonging to a local network; and
a cloud server not belonging to the local network, wherein the information processing apparatus includes
a determination unit configured to determine whether or not an instruction for printing based on a print job is given by a remote operation, and
a decision unit configured to decide any one of the at least one information processing apparatus, the multi-function peripheral, and the cloud server as a storage destination of the print job in accordance with a result of the determination by the determination unit, and
the multi-function peripheral includes
an acquisition unit configured to acquire the print job of the storage destination, and
a printing unit configured to perform printing based on the print job acquired by the acquisition unit.

11. A non-transitory computer-readable storage medium storing a computer program for causing a computer of an information processing apparatus to function as
a determination unit configured to determine whether or not an instruction for printing based on a print job is given by a remote operation; and
a decision unit configured to decide one of apparatuses belonging to a local network, to which the information processing apparatus belongs, as a storage destination of the print job in accordance with a result of the determination by the determination unit.

* * * * *